US012577814B2

(12) United States Patent
Schmitz

(10) Patent No.: US 12,577,814 B2
(45) Date of Patent: Mar. 17, 2026

(54) ACTUATOR ASSEMBLY

(71) Applicant: Witte Automotive GmbH, Velbert (DE)

(72) Inventor: Frederik Schmitz, Wülfrath (DE)

(73) Assignee: Witte Automotive GmbH, Velbert (DE)

( * ) Notice: Subject to any disclaimer, the term of this patent is extended or adjusted under 35 U.S.C. 154(b) by 121 days.

(21) Appl. No.: 18/187,713

(22) Filed: Mar. 22, 2023

(65) Prior Publication Data

US 2023/0304330 A1 Sep. 28, 2023

(30) Foreign Application Priority Data

Mar. 22, 2022 (DE) ..................... 10 2022 202 808.2

(51) Int. Cl.
*E05B 81/76* (2014.01)
*E05B 85/10* (2014.01)

(52) U.S. Cl.
CPC .............. *E05B 81/76* (2013.01); *E05B 85/10* (2013.01); *E05Y 2900/531* (2013.01)

(58) Field of Classification Search
CPC .......... E05B 81/76; E05B 81/04; E05B 81/08; E05B 81/26; E05B 81/32; E05B 81/77; E05B 85/10; E05B 85/00; E05B 85/16; E05B 85/14; E05B 85/18; E05B 47/0038; E05Y 2900/531; H01H 2231/026; H01H 36/0013; Y10T 292/57
See application file for complete search history.

(56) References Cited

U.S. PATENT DOCUMENTS

| | | | | |
|---|---|---|---|---|
| 5,646,587 A * | 7/1997 | Miyazawa | ............. | H03K 17/97 335/207 |
| 5,862,691 A * | 1/1999 | Friedrich | ................ | E05B 17/22 70/264 |
| 5,890,384 A * | 4/1999 | Bartel | ..................... | E05B 81/64 70/264 |
| 6,459,373 B1 * | 10/2002 | Edwards | ................. | E05B 81/78 70/264 |

(Continued)

FOREIGN PATENT DOCUMENTS

| | | | | |
|---|---|---|---|---|
| CN | 107742596 A | 2/2018 | | |
| DE | 10300572 A1 * | 7/2004 | ............. | E05B 81/76 |

(Continued)

OTHER PUBLICATIONS

WO2007121817A1 Espacenet machine translation claims and description (Year: 2024).*

(Continued)

*Primary Examiner* — Steven A Tullia
(74) *Attorney, Agent, or Firm* — Marshall & Melhorn, LLC

(57) ABSTRACT

An actuator assembly for a vehicle may have at least one detection unit and an actuating surface, movable relative to the detection unit, for actuating at least one vehicle function. The movable actuating surface may have a magnetic component, and the detection unit may have at least one sensor unit. The sensor unit and the magnetic component are oriented relative to one another such that an actuation movement of the actuating surface causes a change in a magnetic field detectable by the sensor unit.

11 Claims, 3 Drawing Sheets

(56) References Cited

U.S. PATENT DOCUMENTS

| | | | | |
|---|---|---|---|---|
| 6,657,537 | B1 * | 12/2003 | Hauler | B60R 25/246<br>340/5.1 |
| 6,765,472 | B2 * | 7/2004 | Suparschi | G07C 9/00309<br>340/5.63 |
| 8,576,047 | B2 * | 11/2013 | Peschl | H03K 17/955<br>180/289 |
| 10,008,349 | B2 * | 6/2018 | Kernebeck | H03K 17/972 |
| 10,174,529 | B2 * | 1/2019 | Saitou | H01H 13/06 |
| 10,641,008 | B2 * | 5/2020 | Pukari | E05B 47/0038 |
| 10,647,290 | B2 * | 5/2020 | Spick | B60R 25/01 |
| 11,084,379 | B2 * | 8/2021 | Sung | B60K 35/80 |
| 11,170,955 | B2 * | 11/2021 | Cho | B60K 35/60 |
| 11,462,373 | B2 * | 10/2022 | Kim | G06F 3/03547 |
| 11,739,573 | B2 * | 8/2023 | Scheiern | G01D 5/12<br>292/336.3 |
| 11,764,781 | B2 * | 9/2023 | Day | B32B 17/10036<br>200/341 |
| 12,044,045 | B2 * | 7/2024 | Carmo | E05B 47/0038 |
| 12,123,228 | B2 * | 10/2024 | Mensch | E05B 79/06 |
| 12,320,168 | B2 * | 6/2025 | Mensch | H03K 17/975 |
| 2004/0217601 | A1 * | 11/2004 | Garnault | E05B 81/78<br>292/336.3 |
| 2010/0236911 | A1 | 9/2010 | Wild et al. | |
| 2014/0310916 | A1 * | 10/2014 | Shimizu | E05B 85/16<br>16/412 |

FOREIGN PATENT DOCUMENTS

| | | | | | |
|---|---|---|---|---|---|
| DE | 102004026442 | A1 | * | 12/2005 | E05B 81/76 |
| DE | 102005031441 | A1 | * | 1/2007 | E05B 81/78 |
| DE | 102005041081 | A1 | * | 3/2007 | E05B 81/90 |
| DE | 202011051817 | U1 | * | 3/2013 | E05B 15/04 |
| DE | 202014105458 | U1 | | 11/2014 | |
| EP | 1111171 | A1 | | 6/2001 | |
| EP | 1128003 | A1 | | 8/2001 | |
| EP | 1224369 | B1 | * | 10/2004 | E05B 81/78 |
| EP | 1801324 | A2 | | 6/2007 | |
| EP | 1836945 | A2 | | 9/2007 | |
| EP | 1902189 | B1 | * | 6/2009 | E05B 81/78 |
| EP | 2088267 | A2 | * | 8/2009 | E05B 39/007 |
| EP | 3162988 | B1 | * | 8/2018 | E05B 41/00 |
| EP | 3739155 | A1 | | 11/2020 | |
| FR | 2802564 | B1 | * | 2/2002 | E05B 81/76 |
| FR | 2932727 | A1 | * | 12/2009 | H01H 19/14 |
| JP | S60451 | Y2 | * | 1/1985 | E05B 17/10 |
| JP | H09250265 | A | * | 9/1997 | G07C 9/00309 |
| JP | 2000145228 | A | | 5/2000 | |
| JP | 2004060191 | A | * | 2/2004 | H01Q 1/3241 |
| JP | 2008057237 | A | * | 3/2008 | E05B 1/00 |
| JP | 2016207434 | A | | 12/2016 | |
| KR | 20120046803 | A | * | 5/2012 | H01H 13/14 |
| KR | 20120046804 | A | * | 5/2012 | H01H 13/14 |
| KR | 20140126889 | A | * | 11/2014 | B60K 15/05 |
| KR | 101805104 | B1 | * | 12/2017 | H01H 25/065 |
| KR | 20180046128 | A | * | 5/2018 | H01H 25/06 |
| KR | 102007168 | B1 | * | 8/2019 | H01H 13/06 |
| WO | WO-2005038176 | A1 | * | 4/2005 | E05B 81/76 |
| WO | 2005116376 | A1 | | 12/2005 | |
| WO | WO-2007121817 | A1 | * | 11/2007 | E05B 81/78 |
| WO | WO-2018162108 | A1 | * | 9/2018 | E05B 77/34 |
| WO | WO-2019122913 | A1 | * | 6/2019 | B32B 17/10036 |

OTHER PUBLICATIONS

KR 20120046803 A Espacenet machine translation claims and description (Year: 2025).*

WO 2005038176 A1 Espacenet machine translation claims and description (Year: 2025).*

European Patent Office, Extended European Search Report for Application No. EP23163527.7, dated Aug. 4, 2023, 9 pages.

China National Intellectual Property Administration, Office Action in Application No. CN 202310282604.9, dated Jun. 12, 2025, 10 pages.

* cited by examiner

ACTUATOR ASSEMBLY

FIELD

The invention relates to an actuator assembly, e.g., a door handle assembly, for a vehicle.

BACKGROUND

Actuator assemblies, such as, for example, door handle assemblies, are known, for example, on vehicle doors, tailgates, or engine hoods. Actuator assemblies for actuating or activating at least one vehicle function are known from the prior art. For example, door handle assemblies with fixed door handles are known, wherein a door handle recess is provided below a grippable door handle. Said door handle assemblies are typically provided with a handle element which may be manually actuated in order to be able to open the vehicle door, the tailgate, or the engine hood.

The object of the present invention is to specify an actuator assembly, which is improved compared to the prior art, for a vehicle, and which has a compact design and, in particular, enables simplified actuation and operation of at least one vehicle function and simplified triggering or activation of the at least one vehicle function—for example, of a movable vehicle element, and in particular a vehicle door.

The object is achieved according to the invention by an actuator assembly having the features of the claims.

BACKGROUND

The actuator assembly according to the invention for a vehicle comprises at least one detection unit and an actuating surface, movable relative to the detection unit, for actuating at least one vehicle function, wherein the movable actuating surface has a magnetic component, and the detection unit comprises at least one sensor unit, wherein the sensor unit and the magnetic component are oriented relative to one another such that an actuation, and in particular a movement, of the actuating surface causes a change in a magnetic field that is detectable by the sensor unit. The sensor unit is configured to detect a change in the magnetic field caused by a movement, e.g., a translational and/or rotational movement, of the magnetic component. When the actuating surface is actuated, the magnetic component is designed to be movable relative to the sensor unit.

Examples of possible actuatable vehicle functions, e.g., vehicle actions, by means of actuating the actuator assembly are unlocking and opening a vehicle lock, e.g., a door lock, such as an electromechanical or electrical door lock of a movable vehicle element, and/or starting and/or stopping a movement of a movable vehicle element—for example, a vehicle door, and in particular an electrically-drivable sliding door. However, other vehicle functions could also be carried out using the actuation—for example, as a function of a customer request. The detection unit recognizes the actuation and transmits a corresponding signal to the vehicle. The advantages achieved with the invention are in particular that additional cables, e.g., for conventional microswitch arrangements and/or pushbuttons, are avoided. The actuator assembly according to the invention enables a compact structure with a reduced number of parts, and thus reduced costs. Handling the actuator assembly enables a simplified activation of at least one vehicle function.

The actuator assembly can be arranged on a vehicle exterior—for example, on a vehicle door or on a vehicle pillar. The actuator assembly can be an integral part of a vehicle exterior. For example, the detection unit can be arranged on and/or in a carrier. The actuating surface can be designed to be separate and relatively movable with respect to the detection unit—for example, with respect to the carrier of the detection unit.

A further development of the actuator assembly provides that the movable actuating surface be configured, when actuated, to move the magnetic component along with it in an actuation direction.

A further development of the actuator assembly provides that the movable actuating surface be configured, when actuated, to rotate the magnetic component about an axis of rotation.

A further development of the actuator assembly provides that the magnetic component comprise at least one permanent magnet and/or a component that generates or influences a magnetic field.

A further development of the actuator assembly provides that the movable actuating surface comprise at least one connecting element, which is operatively connected to the magnetic component to move the latter.

A further development of the actuator assembly provides that the magnetic component be fastened to the connecting element.

A further development of the actuator assembly provides that the connecting element be configured, when the movable actuating surface is actuated, to move relative to the magnetic component and to rotate the latter about an axis of rotation.

A further development of the actuator assembly provides that the sensor unit be arranged in the detection unit in a fixed position relative to the actuating surface.

A further development of the actuator assembly provides that the movable actuating surface be provided with a return element.

A further development of the actuator assembly provides that the detection unit comprise at least one evaluation unit coupled to the sensor unit.

The actuator assembly can be designed, for example, as a door handle assembly. The detection unit can, for example, form a handle element or be part of a handle element. Furthermore, an embodiment of the actuator assembly as a door handle assembly is described, according to which the previously described detection unit forms at least one handle element.

The door handle assembly, and in particular an external door handle assembly, for a vehicle comprises at least one handle element and an actuating surface, which is moved relative to the handle element, for unlocking a door lock, wherein the movable actuating surface has a magnetic component, and the handle element comprises at least one sensor unit, wherein the sensor unit and the magnetic component are oriented relative to one another in such a way that an actuation, and in particular a movement, of the actuating surface causes a change in a magnetic field detectable by the sensor unit. The sensor unit is configured to detect a change in the magnetic field caused by a, for example, translational or rotational movement of the magnetic component. When the actuating surface is actuated, the magnetic component is designed to be movable relative to the sensor unit.

The advantages achieved with the invention are in particular that additional cables, e.g., for conventional microswitch arrangements and/or pushbuttons, are avoided. The door handle assembly according to the invention enables a compact structure with a reduced number of parts, and thus reduced costs. A handling of the door handle assembly enables simplified unlocking of the door lock and simplified opening of a vehicle door.

The door handle assembly is designed to be largely resistant to external environmental influences. The door handle assembly is largely wear-free.

The actuating surface may be part of an actuating element. The actuating element may comprise a housing in which the actuating surface is movably guided. The actuating element is provided for unlocking the door lock, wherein the actuating element has at least one movable actuating surface on which at least one magnetic component, e.g., a permanent magnet and/or a component generating or influencing a magnetic field, is arranged.

In one further development, various actuation stages and different actuation speeds of the actuating surface can be detected. For example, different actuation stages and actuation speeds can be detected as a function of a used sensor unit for detecting the change in the magnetic field.

The actuating surface is, for example, configured, when actuated, to move the magnetic component along with it in an actuation direction. For example, the actuating surface can be pushed relative to the handle element in the direction of the vehicle door. In this case, an initial state or a normal state of the magnetic component can change relative to the handle element, and in particular to the sensor unit arranged in the handle element. The magnetic component can carry out a linear movement or can be moved linearly by actuation, and in particular movement, of the actuating surface. The magnetic component and the actuating surface can be connected to one another in such a way that a movement, e.g., a linear movement, of the actuating surface causes a movement, e.g., a linear movement, of the magnetic component. The sensor unit is configured to detect a change in an applied magnetic field that is caused by a movement, e.g., a travel movement or linear movement, of the magnetic component.

The sensor unit can be arranged and fixed in the handle element in a fixed position. The handle element can be formed as a fixed door handle, and in particular an external door handle. A door handle recess can be provided below the handle element that can be gripped by the user. The handle element can be arranged at a distance from an external door surface of a vehicle. Alternatively, the fixed door handle forms a plane with an external surface of a vehicle door, wherein the handle element is arranged in a door handle recess formed in a vehicle door—for example, behind a vehicle outer skin. The handle element can be designed in the form of a handle cover, which partially covers the door handle recess. A user's hand can be positioned for opening the vehicle door in the door handle recess and below the handle element and/or behind the handle element. The handle element can be arranged rigidly on the vehicle.

In an initial state or normal state, the actuating surface, e.g., a surface or external surface, can terminate flush with an external surface of the handle element. The actuating surface can be arranged at an end, e.g., longitudinal end, of the handle element. The sensor unit is arranged on and/or in an end, facing the actuating surface, of the handle element. A distance between the magnetic component and the sensor unit and/or a distance between the end of the handle element and the actuating surface can vary depending upon the sensor unit and/or magnetic component used.

In a further development, the actuating surface is configured, when actuated, to rotate the magnetic component about an axis of rotation. In this case, a starting position or normal position of the magnetic component can change relative to the handle element, and in particular to the sensor unit arranged in the handle element. For example, the actuating surface can be pressed relative to the handle element in the direction of the vehicle door. The magnetic component can be rotated clockwise and counterclockwise. In this case, a starting position or normal position of the magnetic component can change relative to the handle element, and in particular to the sensor unit located in the handle element. The magnetic component can carry out a rotational movement, or can be rotated about the axis of rotation, by way of an actuation, and in particular a movement, of the actuating surface. The magnetic components and the actuating surface can be connected to one another in such a way that a movement, e.g., a linear movement, of the actuating surface causes a movement, e.g., a rotational movement or rotation, of the magnetic component. The sensor unit is configured to detect a change in an applied magnetic field caused by a rotation or turning of the magnetic component.

In an alternative development, the actuating surface can be designed to be rotatable about an axis of rotation and, when actuated, and in particular moved, can move the magnetic component along with it. The magnetic component can be operatively connected to the actuating surface in such a way that an actuation, e.g., a linear movement or a rotational movement, of the actuating surface moves the magnetic component linearly along with it or rotates the magnetic component about an axis of rotation or causes a combined rotational and linear movement of the magnetic component. The magnetic component can carry out a translational and/or rotational movement. The actuating surface can also be configured to carry out a combined translational and rotational movement.

A further advantage is that such a door handle assembly enables an actuation of a, for example, electrically-opening door lock, and in particular a side door lock, via a short stroke actuation within the door handle assembly. In this case, the expenditure of force for opening the movable vehicle element is reduced compared to a vehicle element known from the prior art having a key-lock door handle assembly. The movable vehicle element is, for example, a vehicle door, and in particular a vehicle side door.

Furthermore, a comparatively quick and simplified unlocking of the door lock is made possible for a user. In particular, a keyless unlocking of the door lock is made possible. In this case, time and effort required are reduced if a search for a key to unlock the door lock is avoided. Furthermore, an intuitive opening of the movable vehicle element is made possible.

In addition, an installation space for the door handle assembly is substantially reduced—for example, by eliminating a key-lock function in a handle area of the movable vehicle element. A visual appearance of the movable vehicle element is also improved by eliminating a keyhole.

In a further development, the magnetic component comprises at least one permanent magnet and/or a component that generates or influences a magnetic field. The magnetic component can be designed as a permanent magnet or as a so-called permanent magnet.

The actuating surface comprises at least one connecting element which is operatively connected to the magnetic component for moving the magnetic component. The connecting element can, for example, be connected to the actuating surface at one end, and can have the magnetic component at the other, opposite end.

The magnetic component can be attached to the connecting element directly or indirectly. The connecting element can be a connecting plate, a connecting web, a connecting wall, or another element that can be connected to two components. The magnetic component can be fastened to the connecting element by means of a cohesive, form-fitting, and/or force-fitting connection.

Alternatively, the connecting element and the magnetic component can be formed in one piece. The connecting element can be magnetizable. For example, the connecting element can be provided, e.g., coated, with a magnetic material, at least in sections. At least sections of the connecting element can have at least one magnetic material—for example, a paramagnetic or a ferromagnetic material.

The magnetic component and the connecting element can be operatively connected in such a way that a movement of the actuating surface, e.g., a linear movement, causes a movement, e.g., a linear movement, of the connecting element, and thus of the magnetic component. The connecting element can be operatively connected to the magnetic component in such a way that a movement of the connecting element triggered by the actuating surface drives the magnetic component to carry out a movement in the same actuation direction.

Alternatively, the connecting element and the magnetic component can be operatively connected in such a way that, when the actuating surface is moved, the connecting element is moved, e.g., linearly moved, along with it, wherein the movement of the connecting element causes a rotation of the magnetic component. The connecting element can be operatively connected to the magnetic component in such a way that a movement of the connecting element drives the magnetic component to carry out a rotational movement, and in particular rotation. The connecting element is configured, for example, to move relative to the magnetic component when the actuating surface is actuated, and to move it about its axis of rotation—in particular, to rotate. For example, the magnetic component is mounted movably, and in particular rotatably, on a housing side, facing the handle element, of a housing of the actuating surface.

Alternatively, the connecting element and the magnetic component can be operatively connected to one another in such a way that an actuation of the actuating surface causes a combined rotational and linear movement of the magnetic component and/or of the connecting element.

In a further development, the movable actuating surface is provided with a return element. The return element is, for example, a return spring or a memory foam element. The return element is configured to automatically reset the actuating surface from an actuation state to the initial state. A return force accordingly acts in the opposite direction to an actuation direction.

In a further development, the handle element comprises at least one evaluation unit coupled to the sensor unit. The evaluation unit can be configured to evaluate information detected by the sensor unit and to control the door lock as a function of the information.

DESCRIPTION OF THE FIGURES

Embodiments of the invention are explained in greater detail with reference to the drawings. The figures show.

DETAILED DESCRIPTION

Parts corresponding to one another are provided with the same reference signs in all the drawings.

Figure 1:
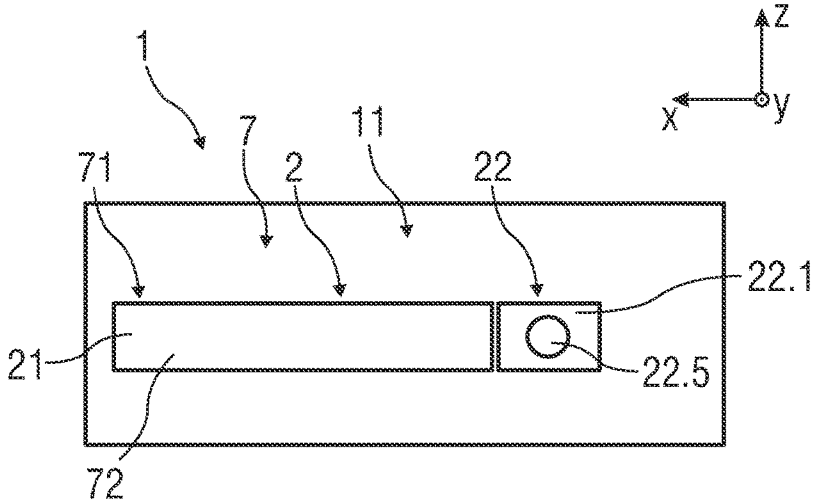
FIG. 1 a schematic front view of a vehicle element, e.g., on a vehicle door or a vehicle pillar, with an actuator assembly according to the invention, e.g., a door handle assembly, FIG. 2 a schematic side view of the vehicle element, which is designed, for example, as a vehicle door, with the actuator assembly according to the invention—in particular, in the form of a door handle assembly, FIG. 3 a schematic sectional view of a further embodiment of the actuator assembly according to the invention, FIG. 4 a simplified schematic sectional illustration of a further embodiment of the actuator assembly according to the invention, FIG. 5 a schematic view indicated in FIG. 4 of an actuating element of the actuator assembly, and FIG. 6 a simplified schematic sectional illustration of a further embodiment of an actuator assembly according to the invention.

FIG. 1 schematically shows a front view of a vehicle element, e.g., on a vehicle door 1 or a vehicle pillar, with an actuator assembly 7, e.g., a door handle assembly 2. The actuator assembly 7 can also be arranged on an external surface of the vehicle pillar. For example, the actuator assembly 7 can terminate flat and/or flush with an outer skin of the vehicle.

For improved understanding, a coordinate system is shown in each case in the figures, wherein the longitudinal axis X corresponds to a longitudinal extension direction, the transverse axis Y to a transverse extension direction, and the vertical axis Z to a vertical extension direction in relation to a vehicle (not shown in more detail) and/or in relation to the vehicle door 1.

The actuator assembly 7 is arranged on a vehicle exterior 11. The actuator assembly 7 comprises a detection unit 71 located on the vehicle exterior 11 and an actuating element 22 for actuating a vehicle function, e.g., for actuating an unlocking and/or opening of a door lock (not shown in greater detail) or for actuating a start function and stop function of a movable vehicle element, e.g., a vehicle door 1, and in particular a sliding door, or a tailgate, or an engine hood.

The actuating element 22 is likewise arranged on the vehicle exterior 11. For example, the actuating element 22 comprises a housing 22.1 and an actuating surface 22.5. Alternatively, the actuator assembly 7 can be an integral part of the vehicle exterior 11. For example, the detection unit 71 and the actuating element 22 can be an integral part of the vehicle exterior 11, and only the actuating surface 22.5 can be designed to be separate and relatively movable with respect to the detection unit 71, e.g., to a carrier 72 or housing of the detection unit 71, and in particular to a carrier base or housing base of the detection unit 71.

In a further development, the actuating element 22 and the detection unit 71 can be arranged to be recessed on and/or in the vehicle exterior 11. The actuating element 22 is arranged, for example, in the vehicle door 1. The vehicle door 1 can have, for example, an embedded recess in which the actuator assembly 7 can be arranged, e.g., recessed. The recess can, for example, be covered in regions by the detection unit 71. The actuating element 22 is formed separately from the detection unit 71. The actuating element 22 is arranged adjacent to one end of the carrier 72 of the detection unit 71.

An actuator assembly 7 designed as a door handle assembly 2 is described below.

The door handle assembly 2 is arranged on a vehicle exterior 11. The door handle assembly 2 comprises a handle element 21 located on the vehicle exterior 11 and an actuating element 22 for unlocking a door lock, which is not shown in detail.

The actuating element 22 is likewise arranged on the vehicle exterior 11. For example, the actuating element 22 comprises a housing 22.1 and an actuating surface 22.5.

In a further development, the actuating element 22 and the handle element 21 can be arranged to be recessed on and/or in the vehicle exterior 11. The actuating element 22 is arranged, for example, in the vehicle door 1. The vehicle door 1 can have, for example, an embedded handle recess, which is covered in regions by the handle element 21. For example, the handle element 21 is designed as a fixed handle. The actuating element 22 is formed separately from the handle housing of the handle element 21. The actuating element 22 is arranged adjacent to one end of the handle element 21. Alternatively, the actuating element 22 can be an integral component of the handle element 21, and only the actuating surface 22.5 can be designed to be separate and relatively movable with respect to the handle element 21 and to the handle housing, and in particular to the handle base 24.

Figure 2:
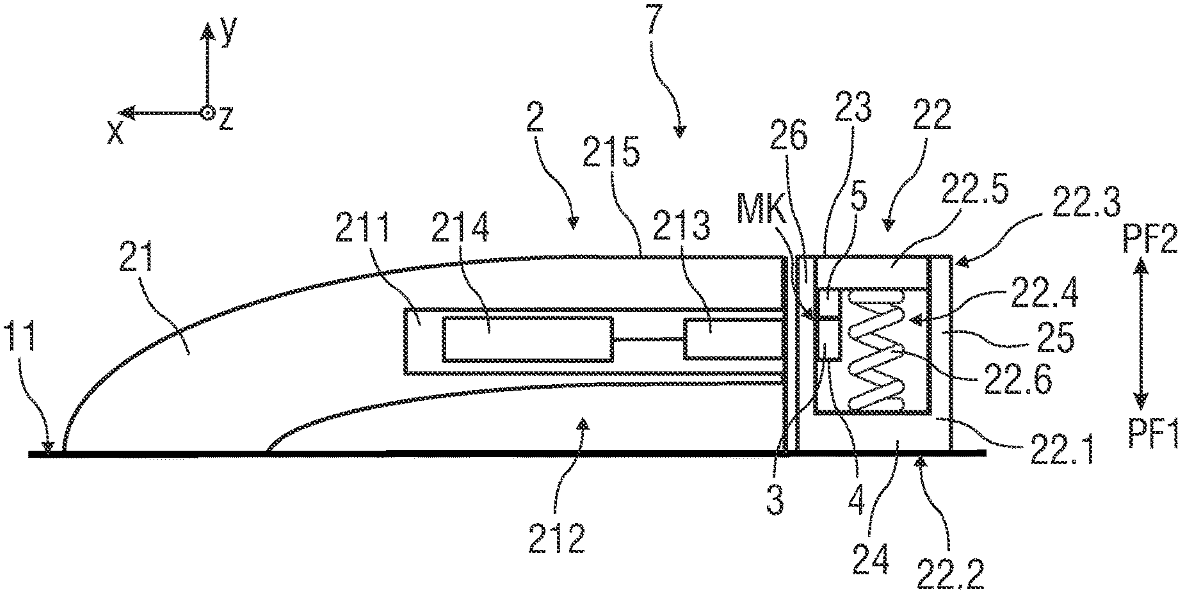

FIG. 2 schematically shows a side view of the vehicle element, e.g., of the vehicle door 1, with the actuator assembly 7 designed as a door handle assembly 2.

The housing 22.1 is designed, for example, in the form of a cap. The housing 22.1 is fastened to the vehicle exterior 11 with a housing end 22.2. A second housing end 22.3 opposite the first housing end 22.2 is directed into a vehicle environment and is arranged, for example, at the level of the handle element 21. The actuating surface 22.5, e.g., a surface or external surface 23 of the actuating surface 22.5, can, in an initial state or normal state, terminate flush with an outer surface 215 of the handle element 21.

The housing 22.1 is substantially U-shaped in cross-section. The housing 22.1 comprises, for example, at least one housing base 24 and at least one housing wall 25 protruding from the housing base 24. The housing 22.1 can be formed in one piece. For example, the housing 22.1 can be an injection-molded part. The housing 22.1 can also be designed in several parts, wherein the housing base 24 and housing wall 25 can be connected to one another, for example, in a cohesive, form-fitting, and/or force-fitting manner.

The housing 22.1 comprises a receiving space 22.4, e.g., in the form of a recess, a cavity, or interior space. The actuating element 22 further comprises a movable actuating surface 22.5 which is arranged in the region of the external housing end 22.3. In an initial state, and in particular normal state and non-actuation state, an exterior, and in particular the external surface 23, of the actuating surface 22.5 terminates flush with the external housing end 22.3. The actuating surface 22.5 is arranged movably in the receiving space 22.4 in the direction of the vehicle exterior 11 or in the direction of the internal housing end 22.2. For example, the actuating surface 22.5 is kept guided. For example, the actuating surface 22.5 can be actuated, e.g., pushed, linearly.

For example, the actuating surface 22.5 can be actuated, and in particular moved, in a first actuation direction, which is indicated by an arrow PF1. The actuating surface 22.5 can automatically be moved into a second direction, indicated by an arrow PF2, directed counter to the actuating device PF1. The actuating surface 22.5 can automatically be moved from an actuating state into the initial state.

Furthermore, the actuating element 22 comprises a return element 22.6, which is arranged in the receiving space 22.4. The return element 22.6 is, for example, a return spring or a foam element, which is designed to be reversibly flexible and/or elastic and/or deformable. The return element 22.6 is supported within the receiving space 22.4 on the internal housing end 22.2 and is coupled to an interior of the actuating surface 22.5. When the actuating surface 22.5 is actuated, e.g., when pushed in, the return element 22.6 is configured to be moved in the direction of the arrow PF1 counter to its spring force, and, when the actuating surface 22.5 is not actuated, and in particular when released or thereafter, to return the latter to its initial state in the direction of the arrow PF2.

A magnetic component MK, e.g., a permanent magnet 3 and/or a component 4 generating or influencing a magnetic field, is arranged on the inside on the actuating surface 22.5. The magnetic component MK can be formed, for example, at least in sections from a ferromagnetic material, e.g., iron, cobalt, and/or nickel.

The magnetic component MK can comprise a permanent magnet 3 or a permanent magnet. The magnetic component MK is, for example, a magnet or a coil.

The magnetic component MK can, alternatively or optionally, additionally comprise a component 4 that generates or influences a magnetic field. The component 4 influencing a magnetic field is formed, for example, from a material which can influence a magnetic field. The material is, for example, a ferromagnetic material. The component 4 is coated, for example, with a ferromagnetic material.

For example, the magnetic component MK is arranged in the receiving space 22.4. For example, the permanent magnet 3 and/or the component 4 are arranged in the receiving space 22.4.

The magnetic component MK is arranged on a housing side 26, opposite the handle element 21, in the housing 22.1.

Figure 3:
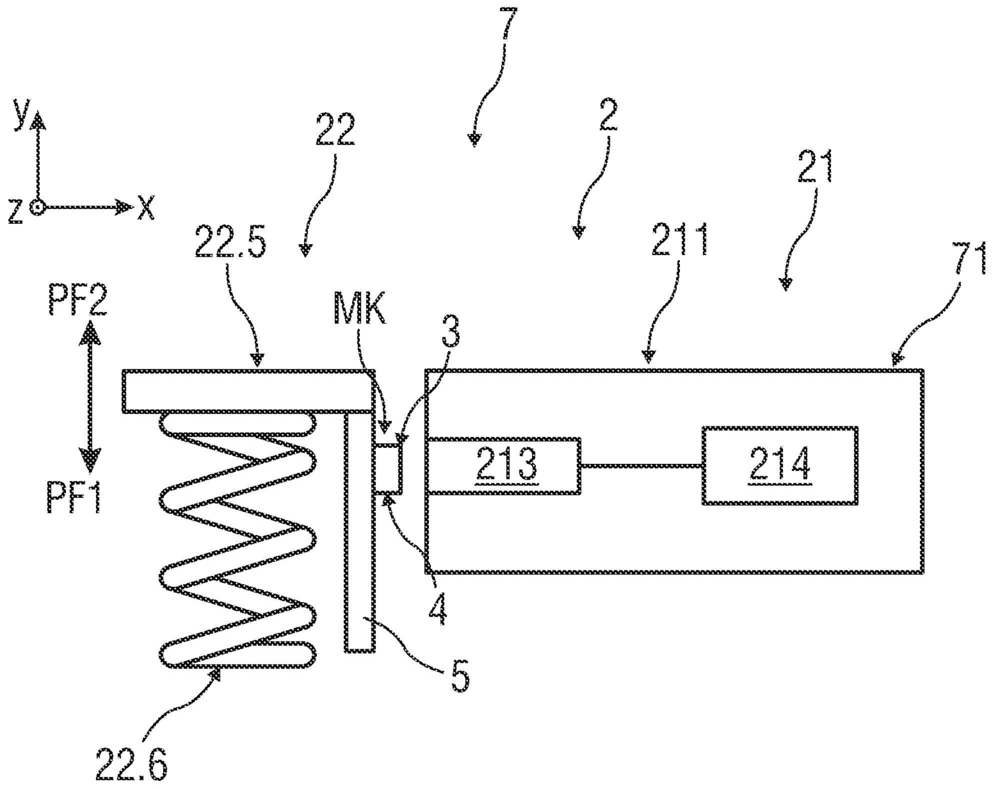

In the embodiment according to FIG. 2 and FIG. 3, the magnetic components MK, e.g., the permanent magnet 3 and/or the component 4, are held by means of an additional connecting element 5 and/or coupling element on an interior of the actuating surface 22.5—for example, fastened in a cohesive, form-fitting, and/or force-fitting manner. The connecting element 5 is, for example, a holding device and/or a holding foam and/or a holding adhesive. The connecting element 5 is arranged together with the magnetic component MK, e.g., the permanent magnet 3 and/or the component 4, in the receiving space 22.4. When the actuating surface 22.5 is moved, the connecting element 5 and the magnetic component MK, e.g., the permanent magnet 3 and/or the component 4, can be moved along with it in the direction of the arrows PF1, PF2.

The handle element 21 and/or the detection unit 71 comprises an electronics unit 211. The handle element 21 and/or the detection unit 71 is fastened to the vehicle exterior 11 and has a handle recess 212 for a user.

The electronics unit 211 comprises a sensor unit 213 and an evaluation unit 214 coupled to the sensor unit 213. The sensor unit 213 is designed, for example, as an inductive sensor or Hall sensor. The evaluation unit 214 is coupled, for example, to the door lock and/or to a control unit controlling the door lock and/or to a control unit that can be activated by another vehicle function.

The sensor unit 213 and the magnetic component MK, e.g., the permanent magnet 3 and/or the component 4, are oriented relative to one another in such a way that an actuation, and in particular a movement, of the actuating surface 22.5 brings about a change in a magnetic field detectable by the sensor unit 213. In an initial state, the sensor unit 213 and the permanent magnet 3 and/or the component 4 are oriented to be substantially parallel to one another. A displacement of the actuating surface 22.5 and thus of the permanent magnet 3 and/or of the component 4 relative to the sensor unit 213 causes a change, at the sensor unit 213, in the magnetic field detected or measured by it.

The sensor unit 213 can detect this change in the magnetic field and transmit corresponding signals to the associated evaluation unit 214. The evaluation unit 214 processes the signals and evaluates them, e.g., as to whether an actuation has taken place, in order to subsequently control the door lock and/or the control unit for unlocking the door lock, and/or for actuating another vehicle function.

After the actuating element 22 has been actuated and the door lock unlocked, the user can open the vehicle door 1 at the handle element 21. The actuating surface 22.5 is brought into its initial state by means of the return element 22.6, without the application of force by the user.

In a further development, the door lock can also be locked, for example, by actuating the actuating element 22. For example, the actuating element 22 is designed with a so-called toggle function.

In a further development, an adjustment of an electrically-drivable vehicle door 1, e.g., a sliding door, can be started and stopped by actuating the actuating element 22.

FIG. 3 schematically shows a sectional illustration of a further embodiment of the actuator assembly 7 according to the invention, which can, for example, be a door handle assembly 2.

For example, the actuating surface 22.5 has a connecting element 5, which projects vertically inwards, i.e., into the receiving space 22.4, on which connecting element the magnetic component MK, e.g., the permanent magnet 3 and/or the component 4, is arranged. The connecting element 5 and the actuating surface 22.5 are designed in one piece, for example. The connecting element 5 is arranged on the housing side 26, facing the handle element 21 and/or the detection unit 71, and in particular its carrier 72, of the actuating element 22.

The connecting element 5 can be present as a separate component. The connecting element 5 can, for example, be connected at one end to the actuating surface 22.5 and be provided at the other, opposite end with the magnetic component MK.

The magnetic component MK can be attached directly or indirectly to the connecting element 5. The connecting element 5 can be a connecting plate, a connecting web, a connecting wall, or another element that can connect two components. The magnetic component MK can be fastened to the connecting element 5 via a cohesive, form-fitting, and/or force-fitting connection.

Alternatively, the connecting element 5 and the magnetic components MK can be formed in one piece. The connecting element 5 can be magnetizable. For example, the connecting element 5 can be provided, e.g., coated, with a magnetic material, least in sections. At least sections of the connecting element 5 can have at least one magnetic material—for example, a paramagnetic or a ferromagnetic material.

The magnetic component MK and the connecting element 5 are operatively connected to one another in such a way that a movement of the actuating surface 22.5, e.g., a linear movement, causes a movement, e.g., a linear movement, of the connecting element 5, and thus of the magnetic component MK.

Figure 4:
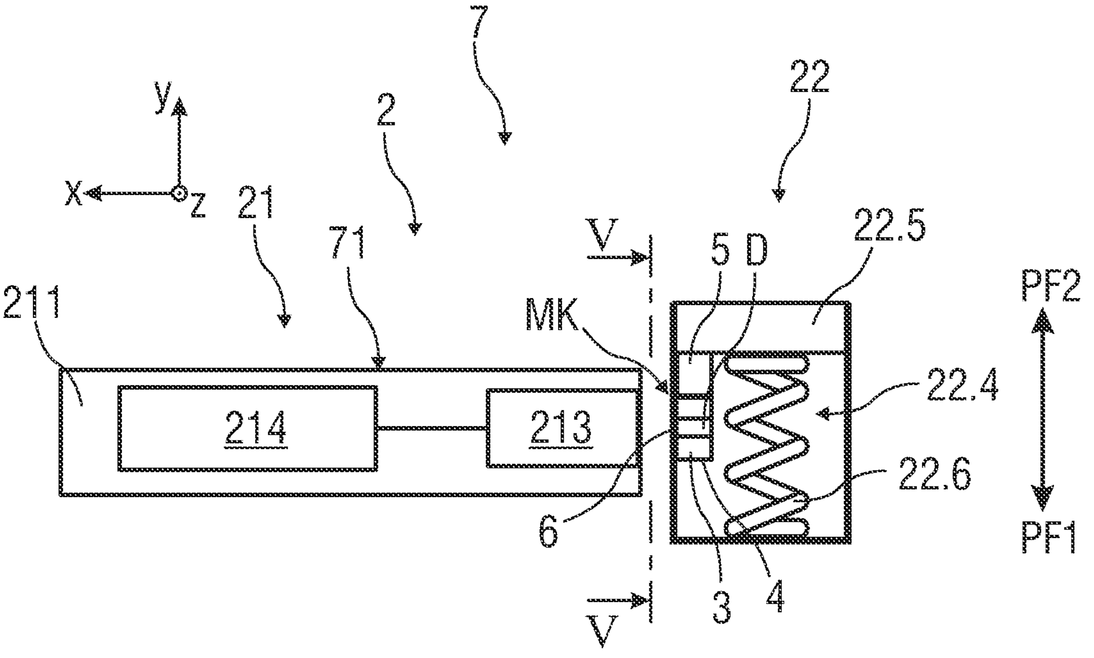

FIG. 4 schematically shows a simplified sectional view of a further embodiment of the actuator assembly 7 according to the invention—for example, a door handle assembly 2.

For example, the magnetic component MK is designed in the form of a rotary disk. For example, the permanent magnet 3 and/or the component 4 is/are designed in the form of a rotary disk. For example, the magnetic component MK is mounted rotatably about an axis of rotation D. The axis of rotation D can, for example, be operatively connected or operatively coupled to the connecting element 5.

For example, the axis of rotation D is formed by a rotatably-mounted bearing element 6. The bearing element 6 is, for example, a bolt or pin. The magnetic component MK is connected to the bearing element 6 in such a way that a rotation of the bearing element 6 about its axis causes a rotation of the magnetic component MK. A movement of the connecting element 5 causes, for example, a movement, and in particular rotation, of the bearing element 6, and thus of the magnetic component MK.

For example, the bearing element 6 and the magnetic component MK are operatively coupled and/or movably coupled to the actuating surface 22.5 by means of a, for example, mechanical, coupling, not shown in more detail. The connecting element 5 and the magnetic component MK can be connected to one another via a coupling. A coupling can, for example, be a toothed connection or a friction connection. A movement of the connecting element 5 thereby causes a movement of the magnetic component MK about the bearing element 6, and thus about its axis of rotation D.

The connecting element 5 and the magnetic component MK are operatively connected to one another in such a way that a movement of the connecting element 5 causes a rotation of the magnetic component MK, wherein, when the actuating surface 22.5 is moved, the connecting element 5 is moved, e.g., linearly moved, along with it. The connecting element 5 is configured, for example, to move relative to the magnetic component MK when the actuating surface 22.5 is actuated. In this case, the movement of the connecting element 5 is transferred to a rotational movement of the magnetic component MK.

Figure 5:
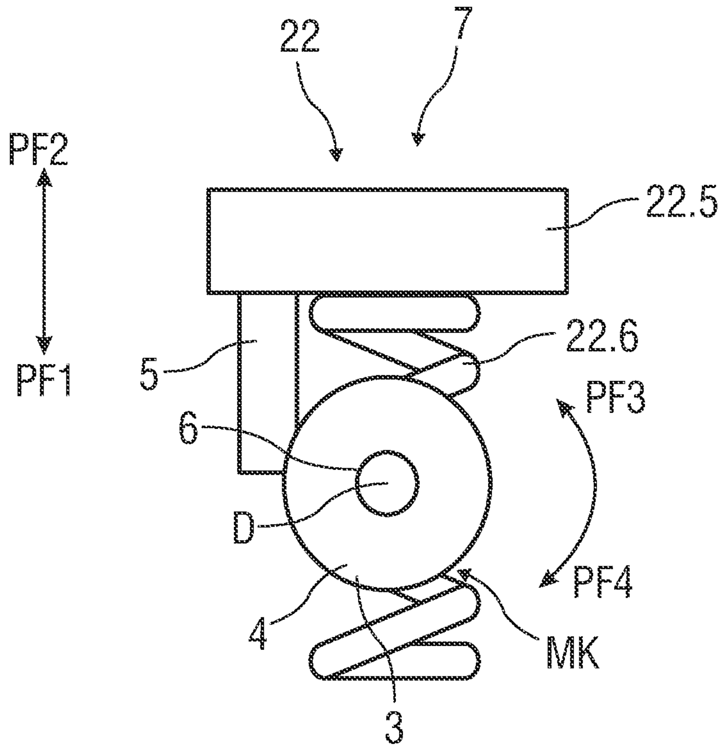

FIG. 5 schematically shows a view indicated in FIG. 4 of the actuating element 22 of the actuator assembly 7—for example, the door handle assembly 2.

The connecting element 5 is connected to the actuating surface 22.5 at one end and, at the other end, is connected to the magnetic component MK in an operative connection. For example, the connecting element 5 and the magnetic component MK can be connected to one another via an operative coupling—for example, via a tooth coupling or friction coupling.

The connecting element 5 and the magnetic component MK are operatively connected to one another in such a way that a movement of the connecting element 5 causes a rotation of the magnetic component MK, wherein, when the actuating surface 22.5 is moved, the connecting element 5 is moved, e.g., linearly moved, along with it. The connecting element 5 is configured, for example, to move relative to the magnetic component MK when the actuating surface 22.5 is actuated. In this case, the movement of the connecting element 5 is transferred to a rotational movement of the magnetic component MK.

By actuating the actuating surface 22.5, the magnetic components MK are, by the connecting element 5 and by means of the mechanical coupling, rotated in the direction of the arrow PF3 or PF4, wherein the sensor unit 213 detects a change in a magnetic field caused by the rotation. For resetting, the magnetic component MK is returned in the opposite direction, and in particular rotated.

Figure 6:
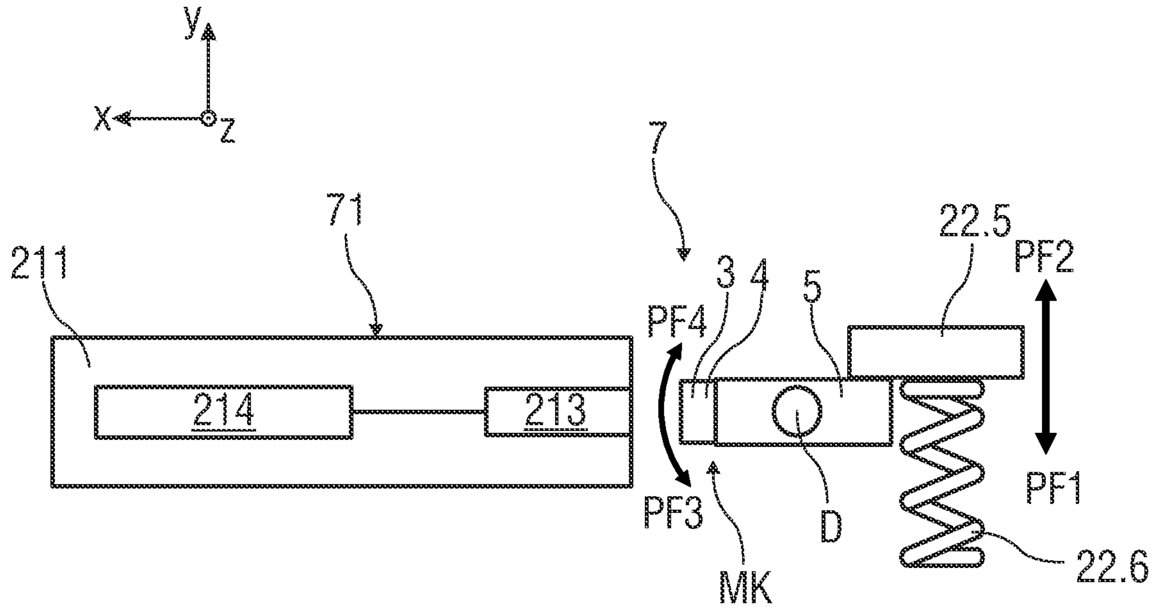

FIG. 6 schematically shows a simplified sectional view of a further embodiment of an actuator assembly 7 according to the invention.

In the embodiment shown, when the actuating surface 22.5 is actuated, the magnetic component MK can move in a direction opposite, e.g., according to arrow PF3, to the actuation direction, e.g., according to arrow PF1. This can be realized, for example, via an axis of rotation D.

For example, the magnetic component MK is designed in the form of a pivotable lever. For example, the permanent magnet 3 and/or the component 4 are designed in the form of a pivotable lever. For example, the connecting element 5 can be designed as a lever element.

The magnetic component MK is connected, for example, to the connecting element 5. The connecting element 5 is pivotable about the axis of rotation D, for example, wherein a pivoting of the connecting element 5 causes a pivoting of the magnetic component MK.

In an initial state, i.e., in a non-actuated state, the connecting element 5 and/or the magnetic component MK can extend substantially perpendicular to the transverse axis y. In an initial state, the connecting element 5 and/or the magnetic component MK extend substantially parallel to the actuating surface 22.5. The connecting element 5 is provided, at an end facing the detection unit 71, with the magnetic component MK. An end, opposite the magnetic component MK, of the connecting element 5 is in contact with an end of the actuating surface 22.5 in such a way that a movement of the actuating surface 22.5 causes a movement, and in particular pivoting, of the connecting element 5 about the axis of rotation D. By the movement of the connecting element 5, the magnetic component MK is moved along with it. Therefore, when the actuating surface 22.5 is actuated, it presses on the corresponding end of the connecting element 5.

In other words, a linear movement of the actuating surface 22.5 causes a rotational movement of the magnetic component MK and/or of the connecting element 5.

For example, the axis of rotation D is formed by a rotatably-mounted bearing element 6. The bearing element 6 is, for example, a bolt or pin.

When the actuating surface 22.5 is actuated, the magnetic components MK are rotated by the connecting element 5 in the direction of the arrow PF3, wherein the sensor unit 213 detects a change in a magnetic field caused by the rotation. The return element 22.6 is provided for returning the actuating surface 22.5. In this case, the actuating surface 22.5 is moved counter to the actuation direction according to arrow PF1. In this case, the actuating surface 22.5 does not further apply an actuating force to the connecting element 5, whereby the connecting element 5 and the magnetic component MK are returned, and in particular rotated, in the direction according to arrow PF4. For example, the axis of rotation D is spring-preloaded.

LIST OF REFERENCE SIGNS

1 Vehicle door
11 Vehicle exterior
2 Door handle assembly
21 Handle element
211 Electronics unit
212 Handle recess
213 Sensor unit
214 Evaluation unit
215 External surface
22 Actuating element
22.1 Housing
22.2, 22.3 Housing end
22.4 Receiving space
22.5 Actuating surface
22.6 Return element
23 External surface
24 Housing base
25 Housing wall
26 Housing side
3 Permanent magnet
4 Component
5 Connecting element
6 Bearing element
7 Actuator assembly
71 Detection unit
72 Carrier
D Axis of rotation
MK Magnetic component
PF1 through PF4 Arrow—in particular, direction
x Longitudinal axis
y Transverse axis
z Vertical axis

What is claimed is:

1. An actuator assembly for a vehicle, comprising:

at least a fixed handle element with at least one detection unit, and an actuating element separated from the fixed handle element by a gap, the actuating element located within a housing and having an actuating surface, wherein the actuating surface is movable relative to the detection unit, for actuating at least one vehicle function, wherein the housing has a movable magnetic component, and the detection unit comprises at least one sensor unit, wherein the sensor unit and the magnetic component are oriented relative to one another in such a way that an actuation movement of the actuating surface causes a change in a magnetic field detectable by the sensor unit, wherein the magnetic component is arranged in a receiving space of the housing below the actuating surface which, when the actuating surface is actuated, the actuating surface is moved in a direction towards the magnetic component into the receiving space and the actuated actuating surface moves the magnetic component in a vertical direction relative to the detection unit.

2. The actuator assembly according to claim 1, wherein the actuating surface is configured, when actuated, to move the magnetic component along with it in an actuating direction.

3. The actuator assembly according to claim 1, wherein the actuating surface is configured, when actuated, to rotate the magnetic component about an axis of rotation.

4. The actuator assembly according to claim 1, wherein the magnetic component comprises at least one permanent magnet and/or a component that generates or influences a magnetic field.

5. The actuator assembly according to claim 1, wherein the actuating surface comprises at least one connecting element, which is operatively connected to the magnetic component to move the latter.

6. The actuator assembly according to claim 5, wherein the magnetic component is attached to the connecting element.

7. The actuator assembly according to claim 5, wherein the connecting element is configured, when the actuating surface is actuated, to move relative to the magnetic component and to rotate the latter about an axis of rotation.

8. The actuator assembly according to claim 5, wherein the sensor unit is arranged in the detection unit in a fixed position relative to the actuating surface.

9. The actuator assembly according to claim 5, wherein the actuating surface is provided with a return element.

10. The actuator assembly according to claim 5, wherein the detection unit comprises at least one evaluation unit coupled to the sensor unit.

11. The actuator assembly according to claim 5, wherein the magnetic component is laterally offset from the detection unit.

* * * * *